United States Patent [19]

Miller et al.

[11] Patent Number: 5,150,429
[45] Date of Patent: Sep. 22, 1992

[54] IMAGE PROCESSOR WITH ERROR DIFFUSION MODULATED THRESHOLD MATRIX

[75] Inventors: Rodney L. Miller; Craig M. Smith, both of Rochester, N.Y.

[73] Assignee: Eastman Kodak Company, Rochester, N.Y.

[21] Appl. No.: 716,759

[22] Filed: Jun. 18, 1991

Related U.S. Application Data

[63] Continuation of Ser. No. 134,621, Dec. 17, 1987, abandoned.

[51] Int. Cl.$^5$ .............................................. G06K 9/38
[52] U.S. Cl. ..................................... 382/50; 358/457; 358/463; 358/466; 382/54
[58] Field of Search ...................... 382/50, 52, 54, 27, 382/41; 358/443, 448, 452, 455, 456, 457, 463, 465, 466

[56] References Cited

U.S. PATENT DOCUMENTS

| | | | |
|---|---|---|---|
| 4,339,774 | 7/1982 | Temple | 358/283 |
| 4,366,507 | 12/1982 | Mori | 358/283 |
| 4,393,452 | 7/1983 | Sekigawa | 382/50 |
| 4,412,256 | 10/1983 | Heinzl et al. | 358/283 |
| 4,449,150 | 5/1984 | Kato | 358/283 |
| 4,449,240 | 5/1984 | Yoshida | 382/50 |
| 4,562,486 | 12/1985 | Suzuki et al. | 382/50 |

OTHER PUBLICATIONS

"Multiple Error Correction Algorithm for Halftone Continuous Tone and Text Reproduction" by S. J. Fox et al, IBM Technical Disclosure Bulletin, vol. 23, No. 10, Mar. 1981, pp. 4433-4435.

"A Survey of Electronic Techniques for Pictorial Image Reproduction" by J. C. Stoffel et al, IEEE Transactions on Communications, vol. Com-29, No. 12, Dec. 1981, pp. 1898-1925.

*Primary Examiner*—Joseph Mancuso
*Attorney, Agent, or Firm*—Dennis R. Arndt

[57] ABSTRACT

An image processor performs error diffusion by thresholding an incoming gray pixel to black or white, comparing the difference between the black or white print value and the incoming pixel gray level and superimposing the difference on the next pixel gray level. The threshold value is read out from a threshold matrix which has been modulated with a pattern which is complementary to the known artifact pattern of the error diffusion process. Typically, the threshold matrix has sparce threshold values along one of its diagonals, the direction of the diagonal being perpendicular to the prevailing direction of artifacts generated by the error diffusion algorithm.

25 Claims, 6 Drawing Sheets

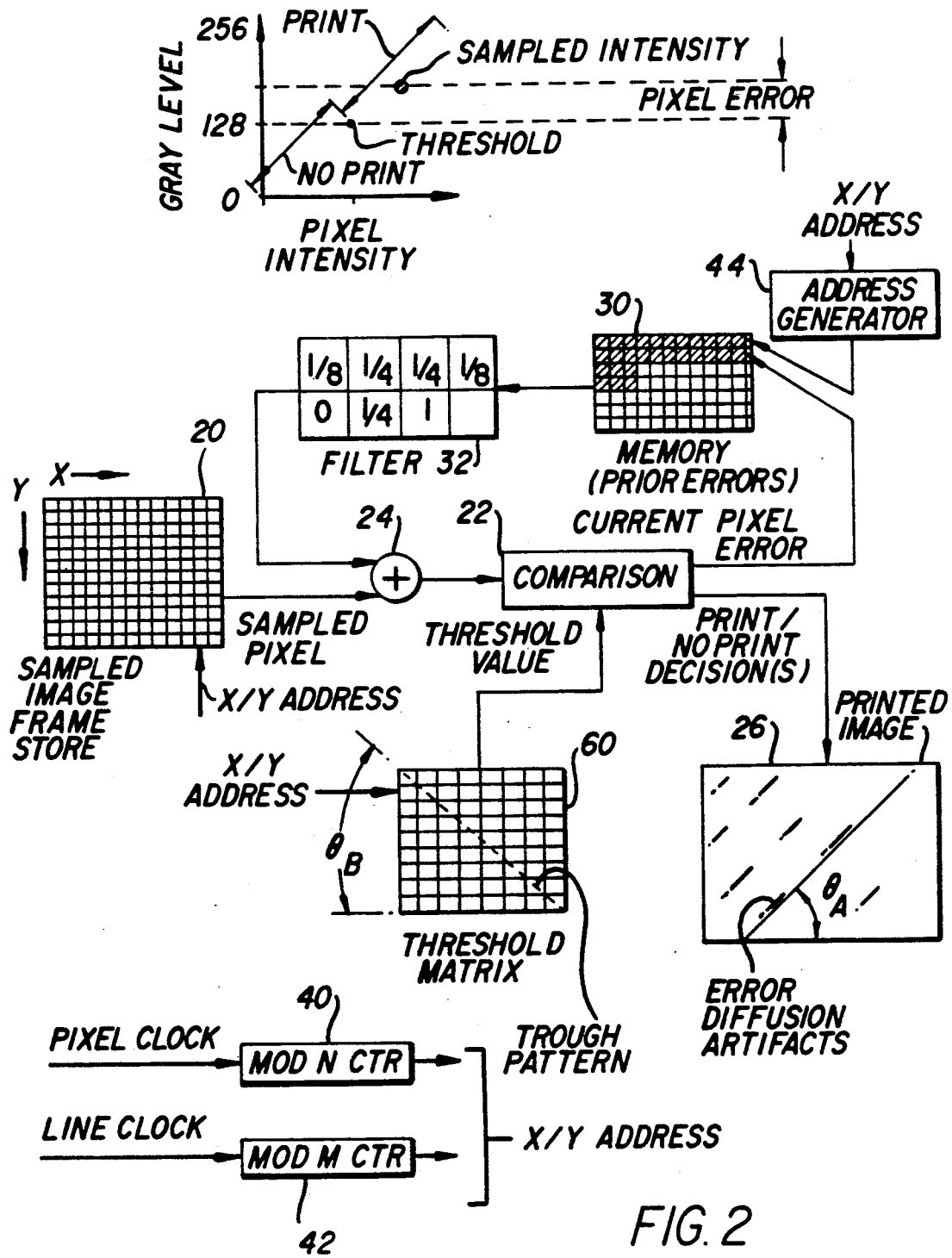

|     |     |     |     |
|-----|-----|-----|-----|
| 96  | 128 | 128 | 128 |
| 128 | 96  | 128 | 128 |
| 128 | 128 | 96  | 128 |
| 128 | 128 | 128 | 96  |

FIG. 3a

| 128 | 128 | 128 | 128 | 128 | 128 | 128 | 128 |
|-----|-----|-----|-----|-----|-----|-----|-----|
| 128 | 96  | 128 | 128 | 128 | 128 | 128 | 128 |
| 128 | 128 | 128 | 128 | 128 | 128 | 128 | 128 |
| 128 | 128 | 128 | 112 | 128 | 128 | 128 | 192 |
| 128 | 128 | 128 | 128 | 128 | 128 | 128 | 128 |
| 128 | 128 | 128 | 128 | 128 | 96  | 128 | 128 |
| 128 | 128 | 128 | 128 | 128 | 128 | 128 | 128 |
| 128 | 128 | 128 | 192 | 128 | 128 | 128 | 112 |

FIG. 3b

|   |   |   |    |
|---|---|---|----|
| 7 | 8 | 9 | 10 |
| 6 | 1 | 2 | 11 |
| 5 | 4 | 3 | 12 |
| 16| 15| 14| 13 |

*FIG. 6a*

|   |   |   |    |
|---|---|---|----|
| 2 | 8 | 9 | 10 |
| 6 | 1 | 7 | 11 |
| 5 | 13| 3 | 12 |
| 16| 15| 14| 4  |

*FIG. 6b*

|    |    |    |    |
|----|----|----|----|
| 1  | 9  | 3  | 11 |
| 13 | 5  | 15 | 7  |
| 4  | 12 | 2  | 10 |
| 16 | 8  | 14 | 6  |

*FIG. 7a*

|    |    |    |    |
|----|----|----|----|
| 1  | 9  | 5  | 11 |
| 13 | 3  | 15 | 7  |
| 6  | 12 | 2  | 10 |
| 16 | 8  | 14 | 4  |

*FIG. 7b*

IMAGE PROCESSOR WITH ERROR DIFFUSION MODULATED THRESHOLD MATRIX

This is a continuation of application Ser. No. 07/134,621 filed Dec. 17, 1987 now abandoned.

BACKGROUND OF THE INVENTION

The accurate portrayal of images which contain more than two gray levels, for example photographs, with an imaging device which can only generate only two levels, black and white, can be accomplished if the imaging device can produce dots which are too small for the eye to detect at normal viewing distance. This makes it possible to take advantage of the integrating tendencies of the eye and allow it to interpret some intermediate grade level based upon the percentage of black or white pixels over some small area of the image.

The gray level is established for each incoming image pixel by sampling the brightness of the image pixel and representing it as a binary eight-bit number, for example. Typically, for each sampled pixel, a decision must be made, based on the gray level, whether or not to print a dot. If the maximum gray level of a sampled pixel is 256, one may select the gray level 128 as the threshold for a print/no print decision. In more complex systems, the threshold is determined by the location of the pixel in the image in accordance with some sort of threshold matrix. Various types of threshold matrices are well-known in the art, such as the concentrated dot matrix and the diffused dot matrix, both described in Kawamura, "Image Processing for Half Tone Reproduction" Denshi Shashin Gakkai-shi (Electrophotography), Vol. 24, No. 1, 1985, pp. 51–59. Their properties are well understood and need not be described here.

Quantization error limits the quality of the reproduced image. Specifically, the input pixel gray level may exceed the threshold where decision to print a dot has been made or may exceed zero while falling below the threshold where a decision to not print has been made. The error in the former case is the amount by which the incoming pixel gray level differs from the black or white print value. In the latter case, the error is the difference by which the incoming pixel gray level exceeds zero. Such an error represents incoming image information which has been essentially discarded by the simple "print/no print" decision process. This problem always exists whenever a bi-tonal system must represent a multiple gray level image.

This fundamental problem has been ameliorated significantly by a technique known as error diffusion, first described in Floyd N. Steinberg, "An Adaptive Algorithm for Spatial Gray Scaling", *The Proceedings of SID*, Vol. 17/2 (1976). In this technique, the error generated by the print/no print decision of a given pixel, rather than being simply discarded, is used to modulate the value of the next incoming pixel gray level. The primary advantage of this technique is its ability to impart a large number of gray levels in the reproduced image. It performs especially well in the presence of very fine details in the image.

PROBLEM TO BE SOLVED

The error diffusion technique suffers from a fundamental limitation, namely the presence of worm-like artifacts in sparce portions of the image. Such worm-like artifacts have a prevailing direction or angle with respect to the base line of the image, which is determined by the particular error diffusion algorithm employed. Generally, all such worm-like artifacts in an error diffused processed image have the same diagonal direction and their length is dependent upon the surrounding pixel density. The problem is how to employ error diffusion image processing without introducing such deleterious worm-like artifacts into the resulting processed image. In the prior art, it is seen that such artifacts would be a necessary unavoidable consequence of use of the error diffusion algorithm. Nevertheless, it has long been a desirable goal in the art to remove the plague of worm-like artifacts from images processed by the error diffusion algorithm.

SUMMARY OF THE INVENTION

Artifacts are removed from error diffusion image processing by modulating the print/no print decision thresholds with which the various incoming pixel gray levels are compared in accordance with a pattern which tends to nullify the error diffusion artifacts. Specifically, a threshold matrix is employed defining a pattern of threshold values which are depressed along one diagonal of the matrix with respect to the remaining threshold value, the direction of the diagonal being generally perpendicular to the prevailing direction of the worm-like artifacts of the error diffusion processing. Experimental results have shown that such a threshold matrix tends to prevent the formation of such worm-like artifacts in an error diffused processed image.

DESCRIPTION OF THE DRAWINGS

The invention may be understood by reference to the accompanying drawings of which:

FIG. 1 is a graph illustrating the print/no print decision required to represent a multiple gray level image with a bi-tonal image;

FIG. 2 is a block diagram illustrating the invention;

FIGS. 3a and 3b illustrate exemplary error diffusion modulated threshold matrices useful in the system of the invention of FIG. 2;

FIGS. 6a and 6b illustrate, respectively, a concentrated dot matrix and an error diffusion modulated concentrated dot matrix; and FIGS. 7a and 7b illustrate, respectively, a diffused dot matrix and an error diffusion modulated diffused dot matrix.

DETAILED DESCRIPTION

Figure 4A:
FIGS. 4a and 4b are results of an experiment showing the virtual elimination of error diffusion artifacts from a processed image in accordance with the invention.

Bi-tonal Representation of a Gray Scale Image

Referring to FIG. 1, a sampled pixel in a gray scale image is represented by an eight-bit byte. The byte assumes an integer value between 0 and 256 as representative of the pixel's gray level. The graph of FIG. 1 shows that as pixel intensity goes up, the value represented by the byte goes up proportionally. If the corresponding gray scale image must be represented in a bi-tonal medium (such as a printer or a copier), a decision must be made for each pixel in the image whether or not to print a dot corresponding to that pixel. (In a more complex system, a decision must be made as to how many dots must be printed in a cluster depending upon the gray level of the sampled pixel.) In the example of FIG. 1, a gray level of 128 is chosen as the print-/no print threshold decision point. If the pixel has a gray level 128 or greater, a dot is printed in the corresponding location in the bi-tonal medium. If not, no dot is printed. In the graph of FIG. 1, the cross-hatched "dot" represents the sampled gray level of a particular pixel. Because it lies above the threshold value 128, a decision is made to "print" a dot in the corresponding location in the bi-tonal medium. The dot represents a gray level 128. Therefore, there is a "pixel error" depicted in FIG. 1 corresponding to the difference by which the sampled gray level exceeds the black intensity of the printed dot or the "print value". This difference is ignored in the simple "print/no print" decision. Loss of such information represents a decrease in the bi-tonal image quality. (The print value of the dot is a characteristic of the printer, toner or medium and is a known quantity. It may be the same as or different from the threshold value. If no dot is printed, the print value is zero.)

Error Diffusion

Referring to FIG. 2, a sampled image 20 comprising a plurality of eight-bit sampled pixel words lying in an X-Y plane is to be printed in a bi-tonal medium. Each sampled pixel, or eight-bit word, is compared by a comparator 22 with a threshold value, which is another eight-bit word. In the example of FIG. 1, the threshold value would be 128. The comparator 22 generates two outputs, namely a print or no print decision (which may be represented as a binary 0 or a binary 1, respectively, and a pixel error, which is the difference (positive or negative) between the print value and the eight-bit word representing the sampled pixel. This difference may be thought of as the error. In order to diffuse the error, it is added in an adder 24 to the next incoming sampled pixel. The resulting sum is compared with the threshold value. Thus, the pixel error, rather than being discarded or lost, is retained and used in subsequent threshold comparisons. The successive print/no print decisions issued by the threshold comparator 22 generate a bi-tonal printed image 26.

A sophisticated version of the error diffusion algorithm requires the use of a memory 30 and a filter 32. The memory 30 stores many (if not all) of the prior pixel errors computed by the threshold comparator 22 in an order reflecting the locations of the corresponding pixels in the image. The filter 32 selects more than just the most recent error for feeding back into the adder 24. Specifically, the filter 32 illustrated in FIG. 2 fetches the four errors from the preceding video line closest to the next sampled pixel as well as the error immediately preceding the next sampled pixel, and multiplies the corresponding errors stored in the memory 30 by various coefficients. Specifically, the errors corresponding to the three pixels closest to the next sampled pixel are multiplied by ⅛, while the errors associated with the remaining two pixels are multiplied by ⅙. The resulting products are added together and added to the gray level of the next sampled pixel in the adder 24 before the comparator 22 performs the next threshold comparison.

The memory 30 may be thought of as a random access memory which receives an X/Y address. Furthermore, the sampled image 20 may be thought of as a frame store memory adapted to receive the stream X/Y address.

The X/Y address is generated by addressing a modulus n counter 40 with a pixel clock and a modulus m counter 42 with a line clock. The line clock corresponds to the rate at which each new row of video data in a sampled image is accessed while the pixel clock defines the rate at which individual pixels in each line are addressed. n is the number of pixels in each line and m is the number of lines in each frame. An address generator 44 computes from the X/Y address the memory addresses of the previous "errors" stored in the memory 30 which must be used by the filter 32 and the adder 24 to perform the error diffusion algorithm with the next sampled pixel. For each new incoming sampled pixel, the X/Y address changes so that a new set of errors are fetched from the memory 30 and furnished to the filter 32.

Problem To Be Solved

The problem is that, while bi-tonal images processed in the foregoing manner exhibit good high spacial frequency response or resolution, they also contain artifacts, such as the artifact 50 illustrated in connection with the printed image 26 in FIG. 2. Generally, the artifacts are worm-like in appearance and have a prevailing direction characterized by an angle $\theta_a$. The problem is how to virtually eliminate such artifacts while still deriving virtually all of the advantages of the error diffusion process of FIG. 2.

Solution To The Problem: Error Diffusion Modulated Threshold Matrix

Rather than applying a constant threshold value to the comparator 22 or furnishing a set of threshold values derived from a conventional concentrated dot threshold matrix or a diffused dot threshold matrix (as mentioned above), an error diffusion modulated threshold matrix 60 furnishes a set of threshold values to the comparator 22 in accordance with the invention. In its simplest embodiment, the threshold matrix 60 has the appearance (in this example) of FIG. 3a in which all threshold values are 128 (as in FIG. 1), except those thresholds lying along a diagonal of the matrix are reduced to 96, forming a diagonal "trough" in the threshold value favoring a "print" decision over a "no-print" decision. The diagonal pattern of these "sparce" or "trough" values corresponds to those image pixel locations lying along an angle $\theta_b$. $\theta_b$ is opposed to the prevailing error diffusion artifact direction ($\theta_a$) by about 90°. Thus, the trough of the error diffusion modulated threshold matrix 60 is perpendicular to the prevailing direction of the error diffusion worm-like artifacts 50.

Various Types Of Threshold Matrices

FIG. 3a illustrates the simplest version of the error diffusion modulated threshold matrix. It is formed by simply taking a matrix whose entries all comprised the threshold value 128 and modulating it by simply reducing the values along a particular diagonal by a set amount. However, the invention is not limited to this form of an error diffusion modulated threshold matrix. The original threshold matrix, rather than being a uniform set of threshold values, may instead be a well-known concentrated dot matrix or diffused dot matrix, whose values have been modulated along a particular diagonal in accordance with the principles discussed above in connection with FIG. 3a.

In the foregoing discussion, an implicit assumption was made that the input image was sampled with the resolution corresponding to the resolution of the bi-tonal medium. In more complex embodiments, the resolution of the bi-tonal medium may be several times that of the pixels in the sampled image. In other words, the number of bi-tonal dots per inch may be N times the number of sampled pixels per inch. In this type of system, each sampled pixel may be represented by as many as N bi-tonal dots, the number of bi-tonal dots depending upon the gray level of the particular input pixel. In this situation, various types of matrices, including the concentrated dot and diffused dot matrix, may be suitably employed to make decisions regarding how many bi-tonal dots to print for a given incoming sampled gray level pixel. The principles of the present invention apply equally in this situation, where error diffusion may be employed in themanner illustrated in FIG. 2. The technique of converting between a gray level image having one pixel density and a bi-tonal image having a different pixel density is sometimes referred to as "scaling", and, as a well-known technique, need not be described further herein.

Experimental Example

The system of FIG. 2 was implemented in software in which the threshold matrices took the form of FIG. 3b. Prior to the experiment, an image was first processed using conventional error diffusion as previously described in connection with FIG. 2. The result is illustrated in FIG. 4a. Note the worm-like artifact in the sparce portions of the image of FIG. 4a. (The filter 32 employed to generate the image of FIG. 4a was exactly as illustrated in FIG. 2.)

Figure 4B:

Introduction of the error diffusion modulated threshold matrix 60 of FIG. 3b resulted in the improved image of FIG. 4b. Note the absence of the pronounced worm-like artifacts.

Low-Cost Hardware Implementation

Figure 5:
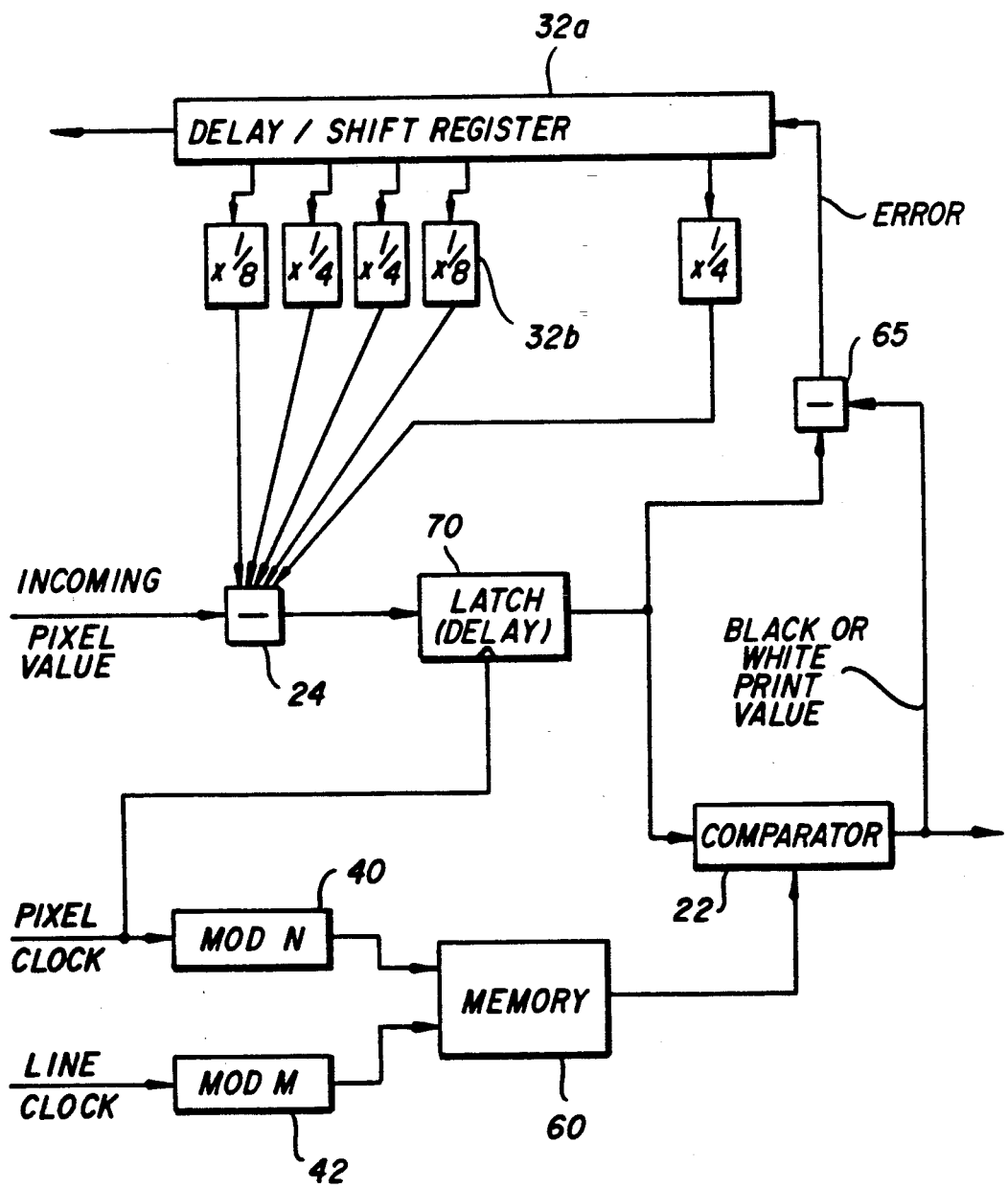
FIG. 5 illustrates a low-cost hardware implementation of the system of FIG. 2.

FIG. 5 is a diagram of a low-cost hardware implementation of the system of FIG. 2. The threshold matrix 60 takes the form of a memory in FIG. 5 addressed by the counters 40 and 42 in the manner described previously. The necessity for a memory 30 to store the prior error values (as in FIG. 2) is obviated because the filter 32 of FIG. 5 takes the form of a shift register 32a having five parallel taps and associated multipliers 32b which multiply by the coefficients illustrated in FIG. 2 in connection with the filter 32 therein. Thus, the filter takes the form of a transversal filter in FIG. 5 with selected taps and coefficient multipliers 32b. Various output values from the transversal filter are combined in the adder 24. The comparator 22 compares the current threshold value and the output of the adder 24 to make a print or no print decision and furnishes the resulting print value to a subtracter 65. The subtractor 65 computes the error by subtracting the print value from the output of the adder 24 and furnishes the difference to the serial input to the shift register 32a. A latch 70 provides the timing transition between the current pixel now being processed in the comparator 22 and the next incoming pixel value augmented in the adder 24.

Other Species Of Error Diffusion Modulated Threshold Matrices

FIG. 6a illustrates a conventional concentrated dot matrix and FIG. 6b illustrates the error diffusion modulated version of the matrix of FIG. 6a.

FIG. 7 illustrates a conventional diffused dot matrix and FIG. 7b illustrates the error diffusion modulated version of the matrix of FIG. 7a.

Other types of matrices may be error diffusion modulated in accordance with the invention. Accordingly, it is understood that, while the invention has been described in detail with specific reference to preferred embodiments thereof, modifications and variations thereof may be made without departing from the spirit and scope of the invention.

What is claimed is:

1. A method for reproducing a gray level image in a bi-tonal medium, comprising:
    a comparison step comprising (a) comparing a summed value with a threshold value to make a print or no print decision characterized by a corresponding one of two print values, and (b) subtracting said corresponding one print value from said summed value to generate a difference;
    a diffusing step comprising (a) storing at least one of a succession of differences generated by said comparison step and (b) combining at least a corresponding one of said differences with an incoming gray level pixel to form a sum and providing said sum as said summed value of said comparison step, wherein said produced diffused image is characterized by a set of elongate artifacts having a prevailing artifact direction;
    determining said threshold value of said comparison step from a matrix of threshold values, the matrix having a trough pattern having a direction generally perpendicular to that of said prevailing direction, said matrix further contains no other trough patterns.

2. The method of claim 1 wherein said diffusing step comprises selecting four previous differences, multiplying them by a corresponding set of four coefficients, and forming a sum therefrom to be combined with a subsequent incoming gray level pixel.

3. In an error diffusion image processing method which accepts a gray level image and reproduces a bi-tonal image therefrom, the improvement comprising:
    an error diffusing step of combining the difference between a current gray level and a print value with a subsequent gray level pixel to produce a diffused signal value corresponding to a diffused image, wherein said produced diffused image is characterized by a set of elongate artifacts having a prevailing artifact direction;
    defining a threshold value in accordance with a matrix of threshold values, the matrix having a trough pattern having a direction generally perpendicular to that of said prevailing direction, said matrix further contains no other trough patterns; and
    comparing said diffused signal value with said threshold value to produce a bi-tonal image.

4. The method of claim 3 wherein said error diffusing step comprises selecting differences between each of a plurality of previous successive gray levels and said print value, multiplying said differences by respective ones of a corresponding plurality of predetermined coefficients, and forming a sum therefrom for combining with said subsequent incoming gray level pixel.

5. The method of claim 4 wherein said prevailing direction is generally along one diagonal in said bi-tonal image and said trough lies along another diagonal in said bi-tonal image generally perpendicular to the diagonal of said prevailing direction.

6. The method of claim 5 wherein said pattern of threshold values comprises an error diffusion modulated concentrated dot matrix.

7. The method of claim 5 wherein said pattern of threshold values comprises an error diffusion modulated diffused dot matrix.

8. The method of claim 3 wherein said print value and said threshold value are different.

9. The method of claim 8 wherein said print value is the black intensity of a printed dot in said bi-tonal image and said threshold value is a gray level about half-way between black and white.

10. A method for reproducing a gray level image in a bi-tonal medium, comprising:
- a comparison step comprising (a) comparing a summed value with a threshold value to make a print or no print decision characterized by a corresponding one of two print values, and (b) subtracting said corresponding one print value from said summed value to generate a difference;
- a diffusing step comprising (a) storing at least one of a succession of differences generated by said comparison step and (b) combining at least a corresponding one of said differences with an incoming gray level pixel to form a sum and providing said sum as said summed value of said comparison step, wherein said produced diffused image is characterized by a set of elongate artifacts having a prevailing artifact direction; and
- determining said threshold value of said comparison step from a matrix of threshold values, the matrix having a trough pattern having a direction generally perpendicular to that of said prevailing direction, said matrix further characterized in that said trough pattern having said generally perpendicular direction is the predominant trough pattern in said matrix.

11. The method of claim 10 wherein said diffusing step comprises selecting four previous differences, multiplying them by a corresponding set of four coefficients, and forming a sum therefrom to be combined with a subsequent incoming gray level pixel.

12. In an error diffusion image processing method which accepts a gray level image and reproduces a bi-tonal image therefrom, the improvement comprising:
- an error diffusing step of combining the difference between a current gray level and a print value with a subsequent gray level pixel to produce a diffused signal value corresponding to a diffused image, wherein said produced diffused image is characterized by a set of elongate artifacts having a prevailing artifact direction;
- defining a threshold value in accordance with a matrix of threshold values, the matrix having a trough pattern having a direction generally perpendicular to that of said prevailing direction, said matrix further characterized in that said trough pattern having said generally perpendicular direction is the predominant trough pattern in said matrix; and
- comparing said diffused signal value with said threshold value to produce a bi-tonal image.

13. The method of claim 12 wherein said error diffusing step comprises selecting differences between each of a plurality of previous successive gray levels and said print value, multiplying said differences by respective ones of a corresponding plurality of predetermined coefficients, and forming a sum therefrom for combining with said subsequent incoming gray level pixel.

14. The method of claim 13 wherein said prevailing direction is generally along one diagonal in said bi-tonal image and said trough lies along another diagonal in said bi-tonal image generally perpendicular to the diagonal of said prevailing direction.

15. The method of claim 14 wherein said pattern of threshold values comprises an error diffusion modulated concentrated dot matrix.

16. The method of claim 12 wherein said print value and said threshold value are different.

17. The method of claim 16 wherein said print value is the black intensity of a printed dot in said bi-tonal image and said threshold value is a gray level about half-way between black and white.

18. A method for reproducing a gray level image in a bi-tonal medium, comprising:
- a comparison step comprising (a) comparing a summed value with a threshold value to make a print or no print decision characterized by a corresponding one of two print values, and (b) subtracting said corresponding one print value from said summed value to generate a difference;
- a diffusing step comprising (a) storing at least one of a succession of differences generated by said comparison step and (b) combining at least a corresponding one of said differences with an incoming gray level pixel to form a sum and providing said sum as said summed value of said comparison step, wherein said produced diffused image is characterized by a set of elongate artifacts having a prevailing artifact direction; and
- determining said threshold value of said comparison step from a matrix of threshold values, the matrix having a principal trough pattern having a direction generally perpendicular to that of said prevailing direction.

19. The method of claim 18 wherein said diffusing step comprises selecting four previous differences, multiplying them by a corresponding set of four coefficients, and forming a sum therefrom to be combined with a subsequent incoming gray level pixel.

20. In an error diffusion image processing method which accepts a gray level image and reproduces a bi-tonal image therefrom, the improvement comprising:
- an error diffusing step of combining the difference between a current gray level and a print value with a subsequent gray level pixel to produce a diffused signal value corresponding to a diffused image, wherein said produced diffused image is characterized by a set of elongate artifacts having a prevailing artifact direction;
- defining a threshold value in accordance with a matrix of threshold values, the matrix having a principal trough pattern having a direction generally perpendicular to that of said prevailing direction; and
- comparing said diffused signal value with said threshold value to produce a bi-tonal image.

21. The method of claim 20 wherein said error diffusing step comprises selecting differences between each of a plurality of previous successive gray levels and said print value, multiplying said differences by respective ones of a corresponding plurality of predetermined coefficients, and forming a sum therefrom for combining with said subsequent incoming gray level pixel.

22. The method of claim 21 wherein said prevailing direction is generally along one diagonal in said bi-tonal image and said trough lies along another diagonal in said bi-tonal image generally perpendicular to the diagonal of said prevailing direction.

23. The method of claim 22 wherein said pattern of threshold values comprises an error diffusion modulated concentrated dot matrix.

24. The method of claim 20 wherein said print value and said threshold value are different.

25. The method of claim 24 wherein said print value is the black intensity of a printed dot in said bi-tonal image and said threshold value is a gray level about half-way between black and white.

* * * * *